US012645865B2

(12) United States Patent
Groarke

(10) Patent No.: US 12,645,865 B2
(45) Date of Patent: Jun. 2, 2026

(54) SYSTEMS AND METHODS FOR PUBLISHING MESSAGES IN A COMMON MODEL

(71) Applicant: MASTERCARD INTERNATIONAL INCORPORATED, Purchase, NY (US)

(72) Inventor: Peter Groarke, Dublin (IE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 197 days.

(21) Appl. No.: 18/379,471

(22) Filed: Oct. 12, 2023

(65) Prior Publication Data

US 2025/0124216 A1 Apr. 17, 2025

(51) Int. Cl.
| | |
|---|---|
| *G06F 40/154* | (2020.01) |
| *H04L 51/066* | (2022.01) |
| *G06F 16/21* | (2019.01) |
| *G06F 16/28* | (2019.01) |

(52) U.S. Cl.
CPC .......... *G06F 40/154* (2020.01); *H04L 51/066* (2013.01); *G06F 16/211* (2019.01); *G06F 16/288* (2019.01)

(58) Field of Classification Search
None
See application file for complete search history.

(56) References Cited

U.S. PATENT DOCUMENTS

| | | | | |
|---|---|---|---|---|
| 7,451,432 B2 * | 11/2008 | Shukla | ................... | G06Q 10/06 |
| | | | | 717/109 |
| 7,533,111 B2 * | 5/2009 | McCollum | ............ | G06F 40/143 |
| 7,711,755 B2 * | 5/2010 | Cruver | ................... | G06F 16/81 |
| | | | | 707/791 |

(Continued)

FOREIGN PATENT DOCUMENTS

| | | |
|---|---|---|
| CN | 102760184 A | 10/2012 |
| CN | 111259634 B * | 6/2023 |

(Continued)

OTHER PUBLICATIONS

Ivan Bedini et al., "Building Reference Ontologies from B2B XML Schema Files", ResearchGate, Jan. 12, 2015; sections 3.2, 4.1: and table1.

(Continued)

*Primary Examiner* — Jean M Corrielus
(74) *Attorney, Agent, or Firm* — Harness, Dickey & Pierce, P.L.C.

(57) ABSTRACT

Example networks and methods are provided for defining a common data model for redundant data in a data specification. One example method includes accessing a message standard, the message standard having multiple message types, each message type including a plurality of classes, each of the classes defined by an .xsd file; splitting the .xsd files into named complexTypes, where each .xsd file includes one complexType which is named for the one complexType; updating references to duplicate named complexTypes to reference an unnumbered superset complexType; and absorbing each of the unique data elements of the duplicate named complexTypes into the unnumbered superset complexType.

18 Claims, 4 Drawing Sheets

(56) References Cited

U.S. PATENT DOCUMENTS

| | | | | | |
|---|---|---|---|---|---|
| 8,060,888 | B2 * | 11/2011 | Ferrigno | H04L 51/066 | 719/316 |
| 8,707,270 | B2 * | 4/2014 | Whelan | G06F 40/154 | 717/136 |
| 9,613,067 | B2 * | 4/2017 | Chang | G06F 16/288 | |
| 2004/0006651 | A1 * | 1/2004 | Dani | H04L 67/02 | 719/315 |
| 2004/0205562 | A1 * | 10/2004 | Rozek | G06F 40/151 | 715/239 |
| 2006/0006503 | A1 * | 1/2006 | Farnworth | B29C 64/135 | 257/642 |
| 2006/0010195 | A1 * | 1/2006 | Mamou | G06Q 10/10 | 709/203 |
| 2006/0069717 | A1 * | 3/2006 | Mamou | G16H 40/20 | 709/203 |
| 2006/0074732 | A1 * | 4/2006 | Shukla | G06Q 10/06 | 717/106 |
| 2006/0101424 | A1 * | 5/2006 | Griffith | G06F 8/51 | 717/136 |
| 2006/0206502 | A1 * | 9/2006 | Gaurav | G06F 16/258 | |
| 2006/0206503 | A1 * | 9/2006 | Gaurav | G06F 40/221 | |
| 2006/0259456 | A1 * | 11/2006 | Falk | G06F 16/116 | |
| 2007/0162476 | A1 * | 7/2007 | McCollum | G06F 40/143 | |
| 2007/0180043 | A1 * | 8/2007 | Vernal | H04L 69/165 | 709/208 |
| 2007/0250766 | A1 * | 10/2007 | Medi | G06F 40/143 | 715/234 |
| 2009/0019455 | A1 * | 1/2009 | Ferrigno | H04L 51/066 | 719/316 |
| 2009/0030920 | A1 * | 1/2009 | Sampathkumar | G06F 40/226 | |
| 2009/0182760 | A1 * | 7/2009 | Box | G06F 16/8373 | 707/999.102 |
| 2009/0216778 | A1 * | 8/2009 | Szyperski | G06F 9/541 | |
| 2012/0330997 | A1 * | 12/2012 | Boag | H04L 67/02 | 707/769 |
| 2012/0331355 | A1 * | 12/2012 | Boag | H04L 67/02 | 714/48 |
| 2013/0095864 | A1 * | 4/2013 | Marovets | G06Q 30/0239 | 455/466 |
| 2014/0052760 | A1 * | 2/2014 | Murphy | G06F 8/41 | 707/803 |
| 2014/0372868 | A1 * | 12/2014 | Kamiya | G06F 40/143 | 715/234 |
| 2015/0178300 | A1 | 6/2015 | Roy et al. | | |
| 2015/0213151 | A1 * | 7/2015 | Chang | G06F 16/288 | 707/803 |
| 2016/0086108 | A1 * | 3/2016 | Abelow | G06Q 30/02 | 705/7.29 |
| 2016/0134932 | A1 * | 5/2016 | Karp | G05B 13/04 | 348/207.11 |
| 2017/0249288 | A1 * | 8/2017 | Kamiya | G06F 40/149 | |
| 2018/0181547 | A1 * | 6/2018 | Macherla | G06F 40/123 | |
| 2019/0220502 | A1 * | 7/2019 | Ohkuni | G06F 40/226 | |
| 2019/0279101 | A1 * | 9/2019 | Habti | G06F 16/383 | |
| 2020/0090144 | A1 * | 3/2020 | Hundling | G06F 16/258 | |
| 2021/0124564 | A1 * | 4/2021 | Giltner | G06F 8/35 | |
| 2021/0157758 | A1 * | 5/2021 | Turpin | H04L 67/12 | |

FOREIGN PATENT DOCUMENTS

| | | | | | |
|---|---|---|---|---|---|
| CN | 111628975 | B * | 6/2023 | | H04L 69/06 |
| EP | 1901180 | A1 * | 3/2008 | | G06F 16/86 |
| EP | 3991064 | B1 * | 5/2023 | | G06F 16/84 |
| WO | WO-2008119593 | A2 * | 10/2008 | | G06F 40/226 |

OTHER PUBLICATIONS

Kereshmeh Afsari et al., 'Building Information Modeling data interoperability for Cloud-based collaboration: Limitations and opportunities', International Journal of Architectural Computing, vol. 15, issue 3, Sep. 15, 2017; 16 pgs.

* cited by examiner

SYSTEMS AND METHODS FOR PUBLISHING MESSAGES IN A COMMON MODEL

FIELD

The present disclosure generally relates to systems and methods for converting a message standard to a common data model, where the message standard includes multiple message sets having common data, usable to reduce different message types of a common message scheme.

BACKGROUND

This section provides background information related to the present disclosure which is not necessarily prior art.

Message standards are known to includes various message sets to define data to the message standard. One example complex message standard includes the International Organization for Standardization (ISO) 20022 message standard, by the International Organization for Standards (https://www.iso20022.org/). Users of the message standards compile messages consistent with the standards, and transmit and receive messages consistent therewith, whereby data included the messages is understood from the data standard. Occasionally, data is included in different message sets for various reasons, including, for example, the specific function of the message type (e.g., inquiry versus authorization, etc.).

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
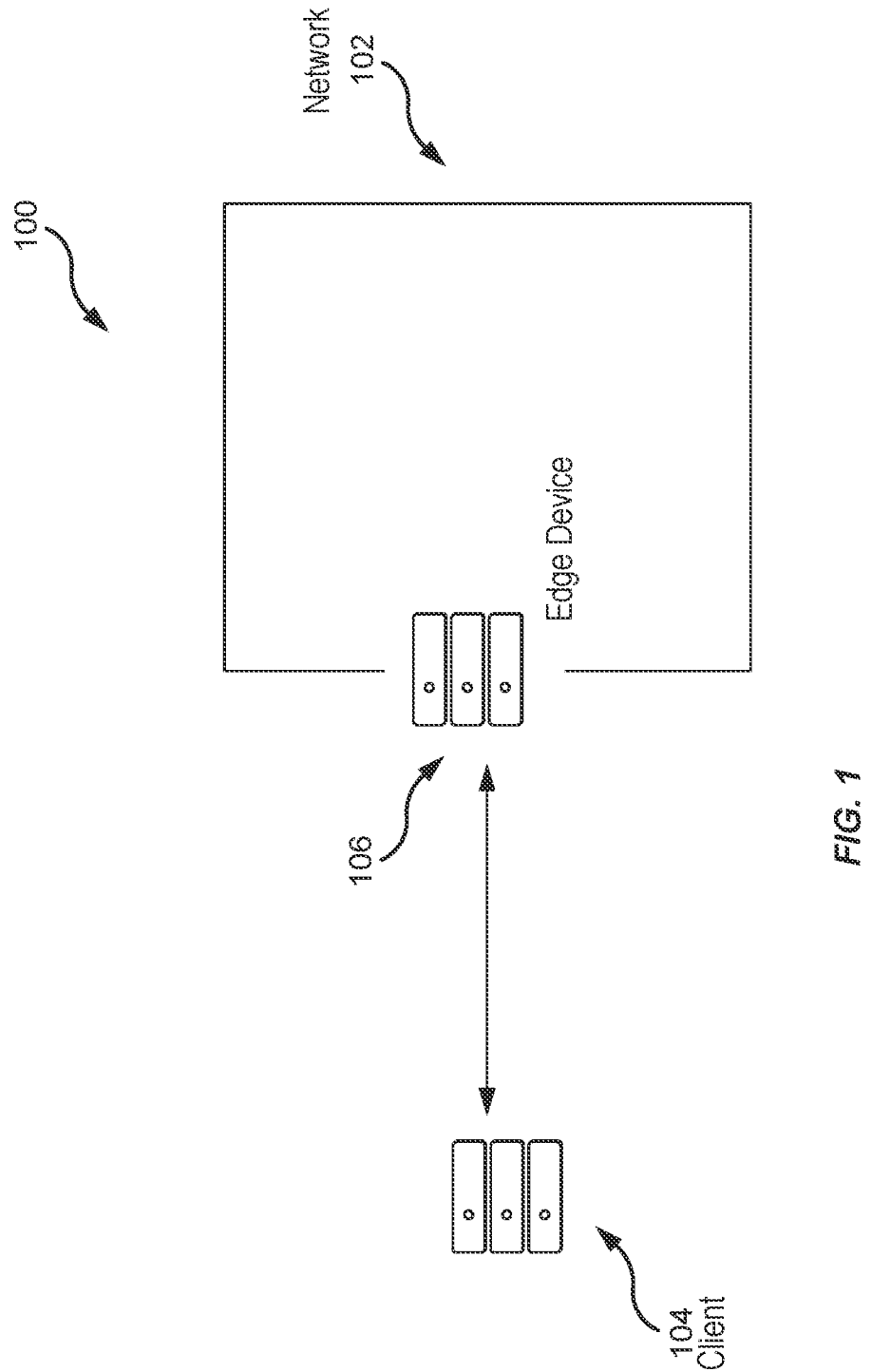
FIG. 1 is a block diagram of an example system of the present disclosure suitable for use in converting a complex message standard to a common data model.

Example embodiments will now be described more fully with reference to the accompanying drawings. The description and specific examples included herein are intended for purposes of illustration only and are not intended to limit the scope of the present disclosure.

In one or more domains, message sets of a message standard include different objects, which include distinct names. Additionally, classes included in the message sets may be common classes, where the objects include the same name, but are further numbered as distinct. The different number indicates a common concept or data, but different data components being included therein. An example of common objects includes CardData6a and CardData9 in the CAIN message set of the ISO20022 message standard, which is specific to financial industry messages. Each includes specific card data, but the card data is different between the two classes thus necessitating the numeric differentiator. In connection with processing messages, it is important for the processor to be able to generically handle the classes regardless of message type from the message standard, especially, for validation of incoming messages agnostic to the message type. Agnostic processing is unconventional and unavailable, whereby separate validation rules and/or other processing is required to be implemented and maintained for each of the message types (whereby common classes are not linked to one another despite common data being included therein).

Uniquely, the systems and methods herein provide for converting a complex data standard to a common data model, where the data standard includes multiple message sets containing common data. In particular, common name classes of the specification are combined into superset classes, which include all the data elements of each subclass. The common data model, by leveraging the superset classes, is then usable to simplify messaging associated with the complex message standard (or definition), where multiple different types of messages consistent with the standard are used. In this manner, the common data model reduces processing time in computing related to the different types of messages, thereby providing for enhanced efficiencies over conventional computing associated with the messages. That is, for example, by defining the common data model or common class model, incoming standard messages to a network (e.g., a payment network, etc.) according to one message type are translated, by an edge device of a network, consistent with the common data model, to a form, format, scheme, etc., which is understood internally to the network (e.g., external message to internal message, etc.). In connection therewith, certain rules (e.g., validation rules, etc.) may be applied at the edge device to the incoming message (s(, after translation, whereby there is no need to account for the different message type of the original un-translated message(s).

In this manner, a single set of rules, criteria, etc. may be defined for incoming messages (in conjunction with the common data model) to provide validation of the messages, rather than a separate set of rules for each message type within the complex data standard. In examples where rules include thousands of rules, this is critical to efficient management of message types for the complex data standard. The common data model provides for consistencies of processing among the different message types and/or elimination or reduction of redundancies among the rules, criteria, etc.

FIG. 1 illustrates an example system 100, in which the one or more aspects of the present disclosure may be implemented. Although parts of the system 100 are presented in one arrangement, other embodiments may include the same or different parts arranged otherwise, depending, for example, on the types and/or priorities of data, privacy rules and regulations, etc.

In the example embodiment of FIG. 1, the system 100 include a service network 102 and a client 104, which is coupled in communication with the service network 102 to access one or more services.

It should be understood that the service network 102 may be any suitable type of service network, where one or more clients interact with the service network 102 to access the services offered thereby. In this example embodiment, the network 102 includes a payment network, which is configured to, among other things, coordinate payment transactions between accounts associated with people, businesses, etc., and associated functions, such as, for example, inquires, authorizations, retrievals, responses, chargebacks, etc. The particular operation may be defined in the message standard associated with the network 102, as explained more below. The network 102, in this example, may further be configured to expose one or more services associated with payment transactions, which may be related to, without limitation, scoring (e.g., fraud scoring, etc.), identity verification, authentication, etc.

In connection with the above, the network 102 is configured to communicate with the client 104 (and numerous other clients), via a message standard that defines messages to be received and/or transmitted therebetween. The message standard in this example embodiment includes an ISO standard, and in particular, the ISO 20022 data standard. See, www.iso20022.org. The message standard includes data terminology and data definitions, which, in turn, are organized into message sets. The message sets, in turn, include various different message types.

Example message sets for the ISO 20022 data standard which may be adopted by and/or configured into the network 102 include, without limitation, the published Acquirer to Issuer Card Transactions (ATICA) CAIN, CANM and CAFC message sets. The ATICA CAIN message set includes the example message types indicated in Table 1. It should be understood, however, from the message standard, that the ATICA CAIN message set includes several additional different message types.

TABLE 1

| Message ID | Message Name |
| --- | --- |
| cain.001.001.03 | AuthorisationInitiationV03 |
| cain.002.001.03 | AuthorisationResponseV03 |

4

TABLE 1-continued

| Message ID | Message Name |
| --- | --- |
| cain.003.001.03 | FinancialInitiationV03 |
| cain.004.001.03 | FinancialResponseV03 |
| . . . | . . . |

The message sets CANM (network management) and CAFC (fee collection) include additional message types. In addition to these message sets, the ISO 20022 message standard includes several other message sets, for example, over thirty, etc. See, https://www.iso20022.org/iso-20022-message-definitions?page=1, which is incorporated herein by reference.

Each of the message sets, in turn, include one or more message types, as shown in Table 1 above. Each of the message types, in turn, includes different data classes. For the message type CAIN.001—AuthorisationInitaitonV03, for example, a segment of the message definition is included below in Table 2. The message segment includes two message or data components, AccountDetails3 and Action13. The message segment also defines validation rules for the data component. That is, a number of permitted occurrences of the component is also provided, i.e., maxOccurs, minOccurs. For example, AcctTp occurs a maximum of one time (i.e., maxOccurs='1') and a minimum of zero times (i.e., minOccurs='0'). That is, only one AcctTp value may be included, but is not required. The message segment also includes value restrictions (e.g., Max70Text, etc.) and enumeration restrictions (e.g., ActionType11Code, etc.).

TABLE 2

```
<?xml version="1.0" encoding="UTF-8"?>
<!--Generated by Standards Editor (build:R1.6.19) on 2023 Jan 04 10:33:20, ISO
20022 version : 2013-->
<xs:schema xmlns="urn:iso:std:iso:20022:tech:xsd:cain.001.001.03"
xmlns:xs="http://www.w3.org/2001/XMLSchema"
elementFormDefault="qualified"
targetNamespace="urn:iso:std:iso:20022:tech:xsd:cain.001.001.03">
    <xs:element name="Document" type="Document"/>
    <xs:complexType name="AccountDetails3">
        <xs:sequence>
            <xs:element maxOccurs="1" minOccurs="0" name="AcctNm"
type="Max70Text"/>
            <xs:element maxOccurs="1" minOccurs="0" name="AcctTp"
type="ISO8583AccountTypeCode"/>
            <xs:element maxOccurs="1" minOccurs="0" name="AcctId"
type="Max70Text"/>
        </xs:sequence>
    </xs:complexType>
    <xs:complexType name="Action13">
        <xs:sequence>
            <xs:element maxOccurs="1" minOccurs="0" name="Dstn"
type="PartyType20Code"/>
            <xs:element maxOccurs="1" minOccurs="0" name="ActnTp"
type="ActionType11Code"/>
            <xs:element maxOccurs="1" minOccurs="0" name="OthrActnTp"
type="Max35Text"/>
            <xs:element maxOccurs="1" minOccurs="0" name="Ctct"
type="Contact6"/>
            <xs:element maxOccurs="unbounded" minOccurs="0" name="AddtlData"
type="AdditionalData1"/>
        </xs:sequence>
    </xs:complexType>
```

As shown in the segment above, in Table 2, the message type is composed of different classes of data such as, for example AccountDetails3 and Action13. These classes may be used in only this message type or may be used in multiple different message types.

That said, the message standard includes a number of common data classes, where the "root" of the class is the same. Amount, for example, is included in different message types as Amount7, Amount12, Amount13, Amount15, Amount16, Amount17, Amount18, Amount19, and Amount20. This is referred to herein as having common name classes. In turn, the data identified in each of the "Amount" classes is the same as to certain data components/elements and different as to other data components/elements. This is the same from many of the other common name classes defined in the ISO 20022 message standard. Consequently, the message standard provides redundant data between different common classes, and more generally, message sets and/or message types.

This may be problematic for input to the network 102, which is advantageously configured to process data elements regardless of the class to which the data element is assigned and/or included in, and also to process messages through consistent validation rules, criteria, etc.

With that said, with reference again to FIG. 1, the network 102 includes an edge device 106. The edge device 106 is coupled to the client 104, whereby the edge device 106 is configured to receive and/or transmit messages from and/or to the client 104. Because the network 102 is compliant with the ISO 20022 message standard, the network 102 is configured to receive one or many of the message types included in the message standard. Consistent therewith, the edge device 106 is configured to receive and/or transmit the messages consistent with the message standard.

In this example embodiment, the edge device 106 is configured, by a common data model, to translate incoming messages to a message-agnostic common message layout and to respond accordingly to data elements regardless of the class in which the data elements are received.

In connection therewith, the network 102 is configured to generate the common data model from the message sets of the message standard. In particular, the network 102 is configured to proceed through a sequence of operations to generate the common data model.

Initially, the network 102 is configured to strip validation from the message sets. The validation, as explained above, includes rules and/or restrictions of the different data elements/components in the message type, such as maximum occurs, minimum occurs, data type, etc. In this example embodiment, the raw ISO20022 ATICA V3 CAIN, CANM and CAFC message sets include twenty-seven .xsd files, which together contain 3129 complexTypes. In stripping the validation, the network 102 is configured to remove value restrictions from the data elements, including, specifically, "minOccurs" and "maxOccurs" qualifiers. The stripping of validation includes one exception, in that the maxOccurs="unbounded" qualifier is retained for further processing, as described below. This is done deliberately because this is an indication of an element's multiplicity (i.e. a List) rather than simply validation, and therefore will be used in the Class definition.

It should be appreciated that in one or more embodiments, stripping of the validation (and the related operations below) may be omitted.

Specifically, for example, where the validation is the same for data components (e.g., with the same name and types, etc.) across different numbered classes, validation rules may be maintained (as it would not create a conflict among the different classes). Stripping of the validation (and the related operations below), therefore, may be employed where, conversely, the validations of the data components vary between the message types.

Next, the network 102 is configured to split the names into complexTypes (including the common name classes), where each complexType includes a .xsd file in the same directory (or data structure), which effectively de-duplicates the complexTypes across the message sets. From this operation, in the above example, only 431 complexTypes remain. An example is presented in Table 3 below, with reference to the Amount common name class.

TABLE 3

| |
|---|
| Amount7.xsd |
| Amount12.xsd |
| Amount13.xsd |
| Amount15.xsd |
| Amount16.xsd |
| Amount17.xsd |
| Amount18.xsd |
| Amount19.xsd |
| Amount20.xsd |

Each of the Amount##.xsd files accounts for each occurrence of the class across the above noted messages sets in the ISO 20022 message standard. It should be appreciated from the "Amount" example, that multiple files are present for a number of the common name classes or complexTypes.

The network 102 is configured to then record the multiplicity of each data element. Specifically, the element property maxOccurs="unbounded" is effectively an indication of multiplicity per element (rather than simply validation), and therefore the unbounded value is recorded to be used in generating the common data model. After the multiplicity is recorded, the element property maxOccurs="unbounded" is also stripped or removed from the data elements.

Next, the network 102 is configured to absorb the "Parameter" ComplexType into the reference AlgorithmIdentification types. In particular, in this example embodiment, there is one exceptional complexType pattern called "Parameter" which is addressed otherwise. The "Parameter" complexType is unique in two respects: a) Parameter is solely referenced by one other Class type, namely AlgorithmIdentification; and b) Parameter is both referenced by and also references another pattern, namely AlgorithmIdentification. Effectively Parameter is acting as an "inner class" or "utility class" to AlgorithmIdentification. As such, the network 102 is configured to subsume the particular patterns definition into the referencing AlgorithmIdentification complexTypes without any loss of data. To do so, the network 102 is configured to update any Parameter Classes with References to AlgorithmIdentification with the relevant AlgorithmIdentification elements and to absorb any Parameter Class elements directly into their referring AlgorithmIdentification classes. In this example, by absorbing the eight Parameters into the AlgorithmIdentification referencer complexTypes provides a decrease from 431 to 423 complexTypes.

The network 102 is configured to update references to any numbered duplicate class to reference an unnumbered superset complexType. For example, the network 102 is configured to change CardData5 and CardData7 references in .xsd files to be CardData. This is completed for all common name classes.

Next, for each duplicate, the network 102 is configured to absorb each of the unique data elements of the numbered complexTypes into a single superset complexType. By way of illustration, Table 4 below illustrates the superset complexType for Amount, which is formed by absorbing the data elements from the Amount7, Amount12, Amount13, Amount15, Amount16, Amount17, Amount18, Amount19, and Amount20 .xsd files.

TABLE 4

```
xs:complexType name="Amount"
  <xs:sequence>
    <xs:element name="Amt" type="xs:decimal"/>
    <xs:element name="Ccy" type="xs:string"/>
    <xs:element name="CdtDbt" type="xs:string"/>
    <xs:element name="ConvsDt" type="xs:date"/>
    <xs:element name="ConvsTm" type="xs:time"/>
    <xs:element name="CstmrNtfdInd" type="xs:boolean"/>
    <xs:element name="Desc" type="xs:string"/>
    <xs:element name="FctvXchgRate" type="xs:decimal"/>
    <xs:element name="Hrs" type="xs:string"/>
    <xs:element name="OthrTp" type="xs:string"/>
    <xs:element name="OthrTpOfChrg" type="xs:string"/>
    <xs:element name="Rate" type="xs:decimal"/>
    <xs:element name="Tax" type="Tax39"/>
    <xs:element name="Tp" type="xs:string"/>
    <xs:element name="TpOfChrg" type="xs:string"/>
  </xs:sequence>
</xs:complexType>
```

Optionally, the network 102 is configured to then remove numbering from any remaining complexType names.

The network 102 is configured to then re-insert the element property maxOccurs="unbounded" thereby giving an indication of multiplicity in the relevant elements within each common complexType. This is again optional, to the extent that the validation is not stripped from the complex-Types.

Finally, the network 102 is configured to convert the resultant .xsd files to .protobuf object, which enables parsing top-level messages into the message-agnostic common message layout defined thereby. The layout of the protobuf (protocol buffer) object defines a serialized data structure to include, contain and hold the values from the different message types in the defined locations of the data structure, in a message-agnostic manner. It should be noted that the serialized data structure includes and/or is associated with a header, which is to include an identifier of the original message type.

The network 102 is configured to store the common data model in memory. Subsequently, the client 104 is configured to transmit a message consistent with one of the message types of the ISO 20022 message standard to the network 102 (which is supported by the network 102). The edge device 106 is configured to receive the message and to translate or convert the message based on the common data model into a message-agnostic common message layout. In this example, the translation or conversion included the content of the incoming message in the message body of the common message and an identifier of the message type in a header of the common message. The common message layout is expressed in protobuf object, in this example, which is a serialized data structure defined by the common data model, i.e., a dictionary of which data components are at which location therein. The edge device 106 is then configured to impose multiple or many validation rules on the message, where the rules may be agnostic to the specific message type (i.e., applied regardless of message type), as is the common message. It should be appreciated that additional rules may also be message type specific, whereby the edge device 106 is configured to identify the message type of the common message (i.e., serialized data structure) from the header of the message (which included an identifier of the message type) and to apply the validation rules specific thereto.

In response to validation failing, the edge device 106 is configured to issue an error to the client 104, indicating, for example, the particular rules violation. Conversely, in response to validation being successful, the internal message is permitted to proceed in the network 102 to its intended purpose (e.g., authorize a payment transaction, batch transfers, inquiries, transaction reversals, verifications, etc.), as permitted by the complex data standard, etc.

It should be appreciated that various types, techniques, and processes may be applied to the common message internal to the network 102. The network 102 may be configured to apply such types, techniques, and processes based on the data included in the common message agnostic of message type and/or to identify the original message type from a header of the common message and to apply the same specific to the message type. Various different types of processing, etc., may be imposed, as desired or required, by the network 102.

It should be further appreciated that where the edge device 106 is configured to transmit messages out of the network 102 to the client 104, the outgoing messages may be converted or translated in a similar manner. That is, the internal messages or agnostic layout includes a header, which includes a message type of the incoming, original messages. Based on the identifier of the message type, the edge device 106 is configured to convert or translate the messages from the serialized data structure into a message consistent with the specific message type.

Figure 2:
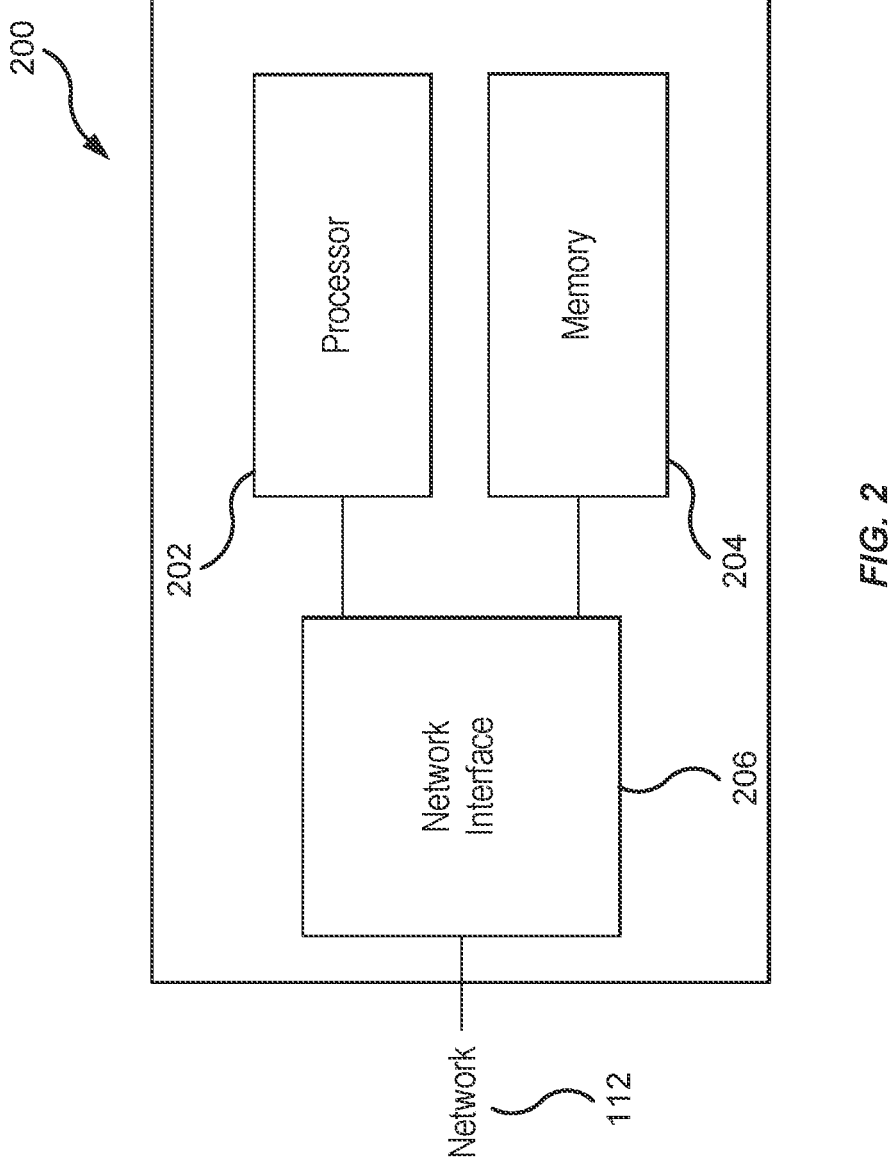
FIG. 2 is a block diagram of an example computing device that may be used in the system of FIG. 1.

FIG. 2 illustrates an example computing device 200 that can be used in the system 100. The computing device 200 may include, for example, one or more servers, etc. In addition, the computing device 200 may include a single computing device, or it may include multiple computing devices located in close proximity or distributed over a geographic region, so long as the computing devices are specifically configured to operate as described herein. In addition, different components and/or arrangements of components may be used in other computing devices. In the example embodiment of FIG. 1, the network 102, the client 104 and the edge device 106 should be understood to be consistent with the computing device 200. The system 100, and its parts, however, should not be considered to be limited to the computing device 200, as different computing devices, and/or arrangements of computing devices may be used in other embodiments.

As shown in FIG. 2, the example computing device 200 generally includes a processor 202, and a memory 204 coupled to (an in communication with) the processor 202. The processor 202 may include, without limitation, a central processing unit (CPU), a microprocessor, a microcontroller, a programmable gate array, an application-specific integrated circuit (ASIC), a logic device, or the like. The processor 202 may be a single core processor, a multi-core processor, and/or multiple processors distributed within the computing device 200.

The memory 204 is a computer readable media, which includes, without limitation, random access memory (RAM), a solid state disk, a hard disk, compact disc read only memory (CD-ROM), erasable programmable read only memory (EPROM), tape, flash drive, and/or any other type of volatile or nonvolatile physical or tangible computer-readable media. Memory 204 may be configured to store, without limitation, routing protocols, rules, and/or other types of data suitable for use as described herein. Furthermore, in various embodiments, computer-executable instructions may be stored in the memory 204 for execution by the processor 202 to cause the processor 202 to perform one or more of the operations described herein, such that the memory 204 is a physical, tangible, and non-transitory computer readable storage media. Such instructions often improve the efficiencies and/or performance of the processor 202 that is performing one or more of the various operations herein. It should be appreciated that the memory 204 may include a variety of different memories, each implemented in one or more of the functions or processes described herein.

The computing device 200 further includes a network interface 206 coupled to (and in communication with) the processor 202, which permits communication with the various other components included in the system 100. The network interface 206 generally includes one or more wired network adapters, suitable for use as described herein, but may also include one or more wireless network adapters, or other devices capable of communicating to one or more of the same or different networks.

Figure 3:
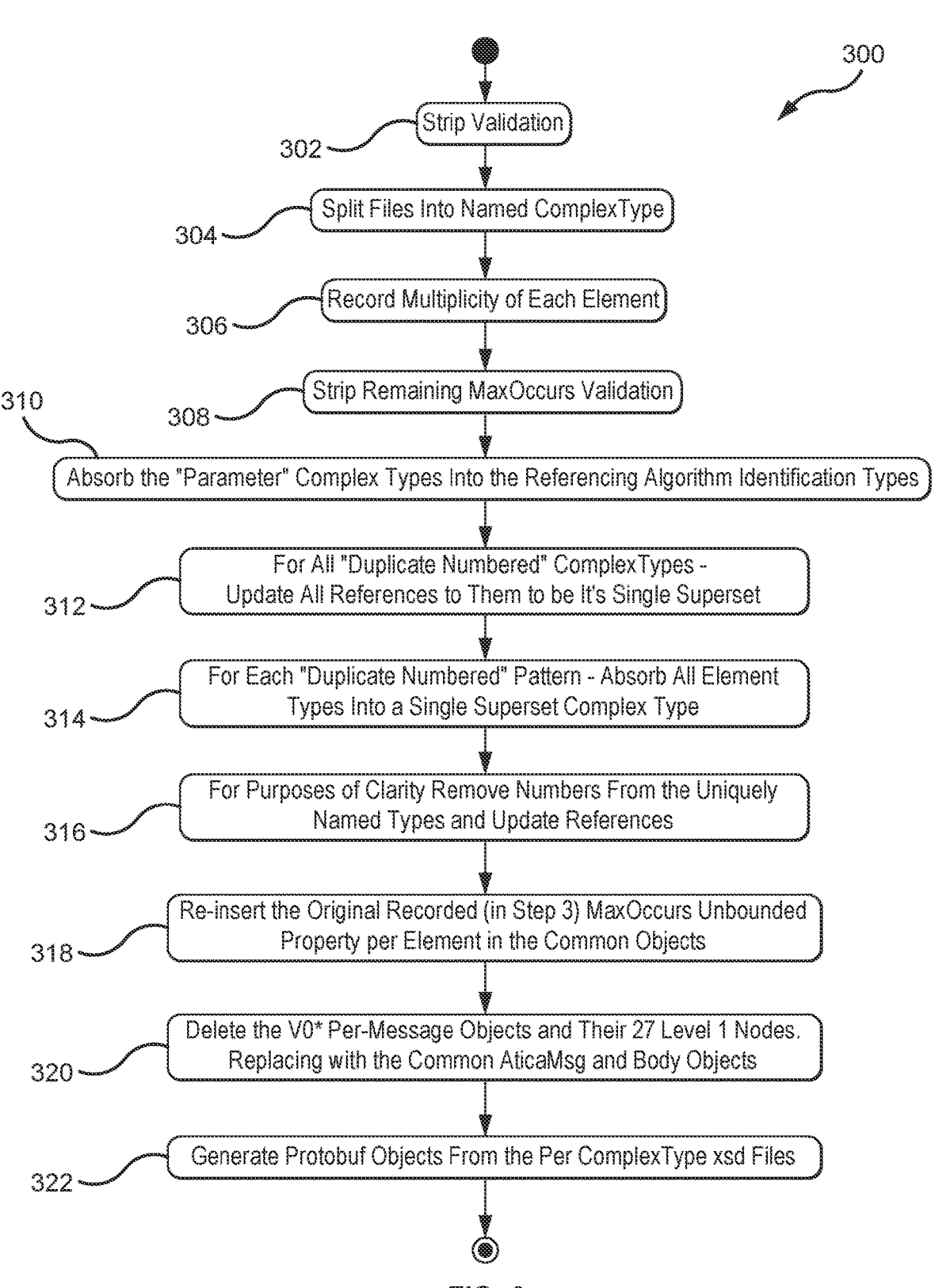
FIG. 3 is an example method of converting a complex message standard to a common data model, and then use of the common data model to translate incoming messages, and which may be suitable for use in the system of FIG. 1.

FIG. 3 illustrates an example method 300 for converting a complex message standard to a common data model. The example method 300 is described as implemented in the network 102. However, it should be understood that the methods herein should not be understood to be limited to the example system 100 or the example computing device 200, and likewise, the networks and the computing devices herein should not be understood to be limited to the example method 300.

At the outset, the network 102 is defined to be in compliance with the ISO 20022 message standard, and multiple of the message types included therein. Because the message types include common classes, which, in turn, include common data elements, it is intended to convert the message sets to a common data model for case in processing and proceeding messages in and through the network 102, regardless of the message type.

To that end, the .xsd files for each class for each of the message sets supported by the network 102 are downloaded or otherwise accessed from an appropriate source and stored into a database (e.g., in memory 204, etc.). It should be appreciated that other forms of files may be associated with the ISO20022 message standard or other message standards for which method 300 may be implemented.

In connection therewith, initially, at 302, the network 102 (or computing device thereof) strips validation from the .xsd files of the message sets in the database. In this example embodiment, the message types includes ATICA V3 CAIN, CANM and CAFC, which in turn includes twenty-seven .xsd files in the database. In stripping the validation, the network 102 removes value restrictions from the data elements, including, specifically, "minOccurs" and "maxOccurs" qualifiers. In this example method, the stripping of validation includes one exception, in that the maxOccurs="unbounded" qualifier is retained for further processing as an indicator of multiplicity of data elements.

Next, at 304, the network 102 splits the .xsd files into the named complexTypes, where each complexType is presented by an .xsd file in the same directory, which effectively de-duplicates the complexTypes across the different message sets for the messages supported by the network 102. As a consequence, the directory includes the files for the complexTypes, where common complexTypes include the same name and also a numeric value to distinguish therebetween (e.g., CardData2, CardData6, CardData7, CardData9, CardData10, etc.). It should be appreciated that each is generally related to the common name data, but different data elements may be included.

The network 102 then records multiplicity of each data element, at 306. Specifically, the element property maxOccurs="unbounded" is effectively an indication of multiplicity per element (rather than simply validation), and therefore multiplicity is recorded to be used in generating a common data model. After the multiplicity is recorded, the element property maxOccurs="unbounded" is removed from the data elements (consistent with the stripping of the validation above), at 308.

Next, at 310, the network 102 absorbs the "Parameter" complextType into the reference AlgorithmIdentification types. In particular, there is one exceptional complexType pattern called "Parameter" which is addressed otherwise. As discussed above, the "Parameter" complexType is unique in two respects: a) Parameter is solely referenced by one other Class type, for example, AlgorithmIdentification; and b) Parameter is both referenced by and also references another pattern, for example, AlgorithmIdentification. Effectively Parameter is acting as an "inner class" or "utility class" to AlgorithmIdentification. As such, the network 102 subsumes the particular pattern definitions into the referencing AlgorithmIdentification complexTypes without any loss of data. To do so, the network 102 updates any Parameter Classes with References to AlgorithmIdentification with the relevant AlgorithmIdentification elements and absorbs any Parameter Class elements directly into their referring AlgorithmIdentification classes.

It should be appreciated that in other message standards, other complexTypes may be addressed in specific manners to account for different referencing schemes with the complexTypes.

At 312, for each "duplicate numbered" complexTypes (e.g., CardData2, CardData6, CardData7, CardData9, CardData10, etc.), the network 102 updates references to any numbered duplicate class to reference an unnumbered superset complexType. For example, the network 102 may change the above example .xsd files to be CardData .xsd file.

Next, at 314, for each duplicate, the network 102 absorbs each of the unique data elements of the numbered complexTypes into a single superset complexType. In this manner, the superset complexType includes all the data elements of the different complexTypes in the superset. No data elements are lost. Optionally, the network 102 removes, at 316, numbering from any remaining complexType names. In this manner, each complexType is unnumbered.

At 318, the network 102 re-inserts the element property maxOccurs="unbounded" thereby giving an indication of multiplicity back into in the relevant elements within each common complexType (or complexType superset).

At 320, the network 102 performs optional clean-up, which may include, for example, deleting the original "V0" top-level messages and each one's Body Class, as these are implicitly per-message, etc.

Figure 4:
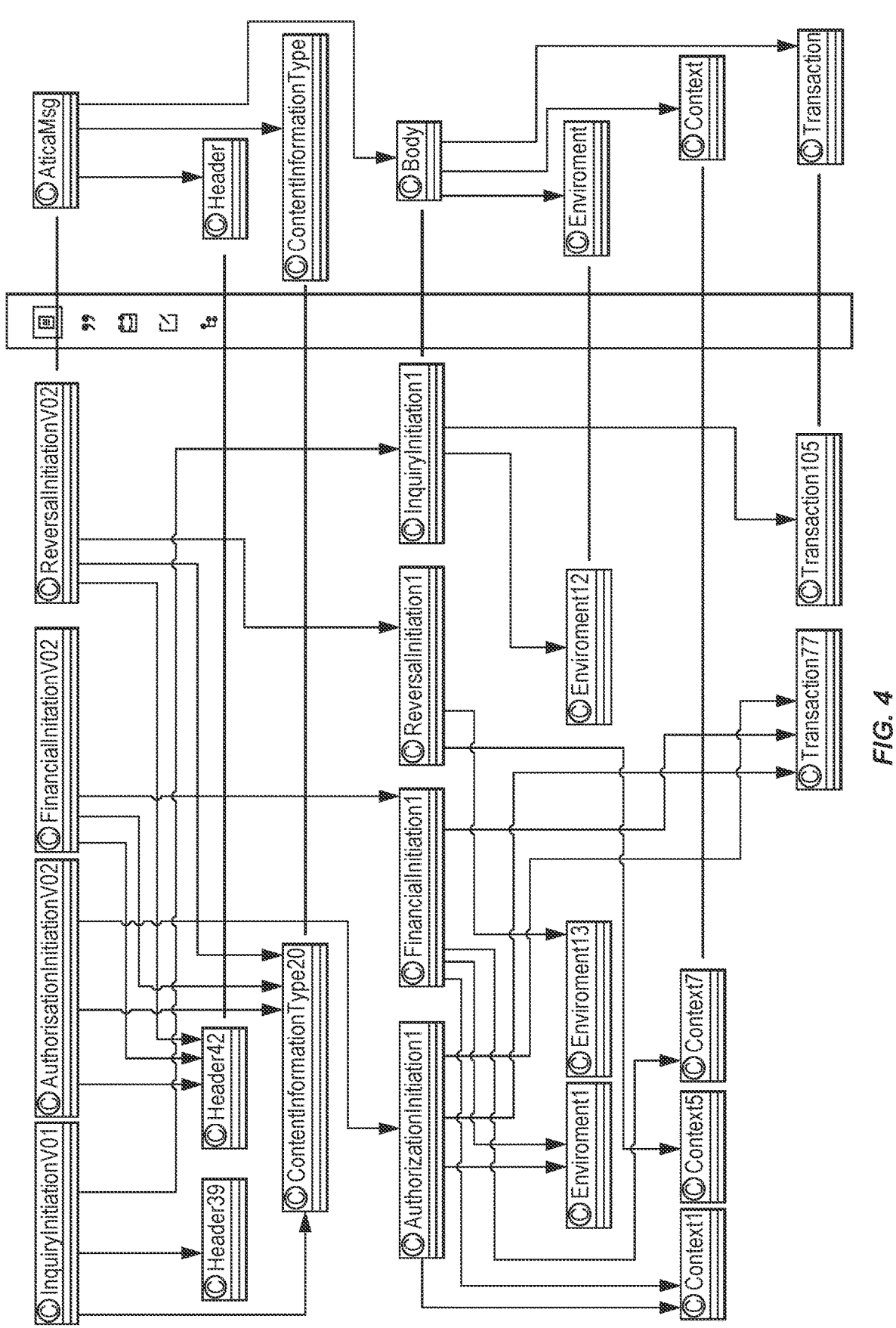
FIG. 4 illustrates a partial conversion between a message standard and a common data model, where common complexTypes are combined.

FIG. 4 illustrates an example graphical representation of the common data model, as it relates to the original message classes of the message standard. As shown, Authorisation-InitationV02 message type is defined in terms of AuthorizationInitiation1, which in turn includes the Environment1 and Context1 data components, while the RefversalInitiationV02 message type is defined in terms of ReversalInitiation1, which in turn includes the Environment13 and Context5 data components. As shown to the right, the Environment1/13 and the Context1/5 common name classes are reduced to Environment and Context in the common data model. As apparent, the common data model defines simplification of the data components across the message sets and/or message types of the message standard.

Finally, referring again to FIG. 3, at 322, the network 102 generates a protobuf object from the per complexType .xsd files. In this manner, the common data model including the message and classes is expressed in a .protobuf object. In this way, the network 102, and more specifically, the edge device 106 is able to leverage the common data model, through a protobuf data format (which is defined by the common data model) to translate incoming messages into the message type agnostic common message layout defined in the protobuf object. The data, as included in the message type agnostic common message layout may be parsed into data consistent with the application of rules, criteria, etc., to validate the incoming messages and to either reject the messages or pass the messages as appropriate through the network 102.

In view of the above, the networks and methods herein provide for consistency and commonality in contravention of the complex message standard having various different message sets and/or message types (with common name classes therein). By generating the common data model, it may then be used to translate incoming messages into a message type agnostic common message layout. The agnostic message data may then be exposed to various validation rules, criteria, etc., which may also then be agnostic to the message type. In this way, common, consistent rules, criteria, etc., may be employed in processing the messages, etc. As such, reduced redundancy of rules, criteria, etc., is gained, along with consistency and reliability efficiencies.

It should be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by: (a) accessing a message standard, the message standard having multiple message types, each message type including a plurality of classes, each of the classes defined by an .xsd file; (b) splitting the .xsd files into named complexTypes, where each .xsd file includes one complexType which is named for the one complexType; (c) updating references in the message standard to duplicate named complexTypes to reference an unnumbered superset complexType; (d) absorbing each of the unique data elements of the duplicate named complexTypes into the unnumbered superset complexType; and (c) generating a protobuf object from the per complexType .xsd files, the protobuf object defining a message type agnostic common message layout.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail. In addition, advantages and improvements that may be achieved with one or more example embodiments disclosed herein may provide all or none of the above mentioned advantages and improvements, and still fall within the scope of the present disclosure.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system for converting a message standard to a common data model, the system comprising: a network computing device including memory having multiple message sets of a message standard and instructions, which when executed by a processor of the network computing device, cause the processor to:

access a message standard, the message standard having multiple message types, each message type including a plurality of classes, each of the classes defined by an .xsd file;

split the .xsd files, by named complexType, into separate .xsd files named for the named complexType;

update references to the named complexTypes of a same name class to reference an unnumbered superset complexType;

absorb each unique data element of the named complexTypes of the same name class into the unnumbered superset complexType; and generate a protobuf object from the separate complexType .xsd files, the protobuf object defining a message type agnostic common message layout.

2. The system of claim 1, wherein the instructions, when executed by the processor, further cause the processor to strip validation from .xsd files of the multiple message sets, prior to splitting the .xsd files.

3. The system of claim 1, wherein the instructions, when executed by the processor, further cause the processor to:

record a multiplicity of each data element based on a property max Occurs="unbounded" in one or more of the separate .xsd files;

remove the maxOccurs="unbounded" from the one or more of the separate .xsd files; and insert the property maxOccurs="unbounded" to the unnumbered superset complexType, prior to generating the protobuf object.

4. The system of claim 1, wherein the message standard is an International Organization for Standardization (ISO) 20022 message standard.

5. The system of claim 1, wherein the message sets include a plurality of message sets, including Acquirer to Issuer Card Transactions (ATICA) CAIN, CANM (network management), and CAFC (fee collection) message sets.

6. The system of claim 5, wherein the instructions, when executed by the processor, further cause the processor to absorb a "Parameter" complexType into a reference AlgorithmIdentification type.

7. The system of claim 1, further comprising an edge device, which is configured to:

receive an incoming message consistent with one of the message types;

convert the incoming message to an internal message based on the message type agnostic common message layout; and validate the incoming message, based on one or more rules and data included the internal message, as defined by the message type agnostic common message layout.

8. A non-transitory computer readable medium, which includes executable instructions, which when executed by a processor of a network computing device, cause the processor to:

access a message standard, the message standard having multiple message types, each message type including a plurality of classes, each of the classes defined by an .xsd file;

split the .xsd files into separate .xsd files by named complexType, where each of the separate .xsd files is named for the named complexType;

update references to the named complexTypes of a same name class to reference an unnumbered superset complexType;

absorb each unique data elements of the named complexTypes of the same name class into the unnumbered superset complexType; and generate a protobuf object from the separate complexType .xsd files, the protobuf object defining a message type agnostic common message layout.

9. The non-transitory computer readable medium of claim 8, wherein the executable instructions, when executed by the processor, further cause the processor to strip validation from .xsd files of the multiple message sets, prior to splitting the .xsd files.

10. The non-transitory computer readable medium of claim 8, wherein the executable instructions, when executed by the processor, further cause the processor to:

record a multiplicity of each data element based on a property max Occurs="unbounded" in one or more of the separate .xsd files;

remove the maxOccurs="unbounded" from the one or more of the separate .xsd files; and insert the property max Occurs="unbounded" to the unnumbered superset complexType, prior to generating the protobuf object.

11. The non-transitory computer readable medium of claim 8, wherein the message standard is an ISO 20022 message standard.

12. The non-transitory computer readable medium of claim 11, wherein the message sets include a plurality of message sets, including Acquirer to Issuer Card Transactions (ATICA) CAIN, CANM (network management), and CAFC (fee collection) message sets.

13. A computer-implemented method for converting a message standard to a common data model, the method comprising:

accessing, by a computing device, a message standard, the message standard having multiple message types, each message type including a plurality of classes, each of the classes defined by an .xsd file;

splitting, by the computing device, the .xsd files into separate .xsd files by named complexType, where each of the separate .xsd files is named for the named complexType;

updating, by the computing device, references to the named complexTypes of a same name class to reference an unnumbered superset complexType;

absorbing, by the computing device, each unique data elements of the named complexTypes of the same name class into the unnumbered superset complexType; and generating a protobuf object from the separate complexType .xsd files, the protobuf object defining a message type agnostic common message layout.

14. The computer-implemented method of claim 13, further comprising stripping validation from .xsd files of the multiple message sets, prior to splitting the .xsd files into name complexTypes.

15. The computer-implemented method of claim 13, wherein the message standard is an ISO 20022 message standard.

16. The computer-implemented method of claim 15, wherein the message sets include a plurality of message sets, including Acquirer to Issuer Card Transactions (ATICA) CAIN, CANM (network management), and CAFC (fee collection) message sets.

17. The computer-implemented method of claim 13, further comprising:

receiving, by an edge device, an incoming message consistent with one of the message types;

converting, by the edge device, the incoming message to an internal message based on the message type agnostic common message layout; and validating, by the edge device, the incoming message, based on one or more rules and bata included the internal message, as defined by the message type agnostic common message layout.

18. The computer-implemented method of claim 17, where the internal message includes a header, which indicates an identifier of the one of the message types; and further comprising identifying the one of the message types and validating the incoming message based on at least one rule specific to the identified one of the message types.

* * * * *